Patented June 22, 1954

2,681,891

UNITED STATES PATENT OFFICE 2,681,891

HYDRAULIC TRANSMISSION FLUID

Louis B. Bos and Frederic C. McCoy, Beacon, N. Y., assignors to The Texas Company, New York, N. Y., a corporation of Delaware No Drawing. Application November 27, 1951, Serial No. 258,508

10 Claims. (Cl. 252—75)

This invention relates to a compounded mineral lubricating oil and, more particularly, to a hydraulic fluid adapted for use in the automatic transmissions of motor vehicles.

In the simple fluid drive or torque converter, the hydraulic fluid is required mainly to transmit torque and to function as a heat transfer medium. However, in the more complicated automatic transmissions which have, in addition to a fluid coupling or a torque converter, wet clutches, planetary gearing and hydraulic control mechanism, additional problems involving adequate lubrication are also involved. Rigorous requirements have been set up to qualify a hydraulic fluid for this service. These requirements include a viscosity index of at least 140 to provide improved operation over a wider temperature range and to insure that a single fluid can be used in all current production automatic transmissions; a flash point of 365° F. minimum and a fire point of 395° F. minimum in order to minimize fire hazards in operation and reduce the tendency toward cavitation caused by vaporization in the hydraulic power transmission section; and a pour point of —35° F. maximum to insure pumpability of the fluid at low atmospheric temperatures. In addition, the fluid must not have a detrimental effect on copper alloys as determined by its ability to pass a copper strip corrosion test; must have no deleterious effect on the synthetic seals used in automatic transmissions; and must have a high degree of oxidation resistance and be able to withstand prolonged heating at high temperatures without decomposition. Finally, the fluid must possess excellent anti-frictional properties involving oiliness and extreme pressure characteristics to afford proper lubrication of the gearing, clutch plates and other parts of the automatic transmission.

As a measure of the ability of the hydraulic fluid to afford proper operation in the automatic transmission, several severe tests have been formulated. Thus, one of the requirements is that the fluid should pass the CRC L–4 Oxidation test at 265° F. crankcase temperature, when the fluid is diluted with an equal volume of a refined uninhibited lubricating oil. Another requirement is that the fluid pass a so-called non-chatter or "squawk" test, which means that the fluid functions in the automatic transmission without objectionable chatter or "squawking." The latter is a high pitched sound produced by a "stick-slip" phenomenon of the clutch plates, particularly in the second-third upshift. A third rigorous requirement is that the fluid should pass a so-called cycling test, which involves operation in the automatic transmission through repeated cycles of idling to full throttle at a transmission oil temperature of 275° F. over a substantial period of time, without substantial deposition of sludge or varnish formation and without injury to the clutch plates.

It has been found that a great variety of additives or inhibitors, which are generally effective in motor oil service in preventing oil oxidation and corrosion and imparting other desirable qualities, either cannot be employed for the present service because the compounded mineral lubricating oil will then not meet the requirements for viscosity, viscosity index and pour point, or are ineffective in the present service because they do not suppress the "squawk" and/or actually increase the amount of sludge formed and the amount of deposits on the clutch plates of the automatic transmission. Moreover, the requirements for additives which satisfactorily suppress the "squawking" tendency and afford suitable operation in the cycling test are quite different from those involved in ordinary crankcase lubrication or diesel motor oil service. The problem, therefore, was not that of selection of known additives for their expected results, but involved entirely new requirements in a non-analogous field.

It is, accordingly, a principal object of the present invention to provide a hydraulic fluid of the type which meets the rigorous requirements for automatic transmission service, and which affords superior operating characteristics in the avoidance of "squawking" in the automatic shift, and the minimizing of sludge deposits with the proper lubrication and protection of the clutch plates in long time service.

In accordance with the present invention, a hydraulic fluid, which satisfactorily meets the above noted rigorous requirements, comprises a refined mineral lubricating oil containing a combination of two, and preferably of all three, of the following additives:

(1) A neutralized $P_2S_5$-olefin polymer reaction product;

(2) An alkaline earth metal salt of an alkylated aromatic sulfonic acid, and (3) A metal salt of an N-substituted dithiocarbamic acid.

In addition, the hydraulic fluid preferably contains a methacrylate ester polymer having viscosity and viscosity index improving properties, and a foam inhibitor, such as a silicone polymer.

The mineral lubricating oil employed, and which constitutes at least 85% by weight of the composition, is a refined oil which is selected according to the viscosity requirements of the particular service. For automatic transmissions where the requirements include an SUS viscosity of the compounded oil at 210° F. of 49 minimum and an SUS viscosity at 0° F. of 7000 maximum, the base oil is generally a distillate oil lighter than an SAE 10 motor oil, such as one having an SUS viscosity at 100° F. of less than 150 and generally about 80-130. The base oil may be prepared from a wax distillate by solvent refining, light acid treating, clay contacting and solvent de-waxing. The base oil will generally have a flash point of about 350-375° F. or higher. However, in service other than passenger car automatic transmissions, it will be understood that other types of mineral lubricating oils having different viscosities can be employed. Ordinarily, a paraffin base distillate mineral lubricating oil is selected.

The methacrylate ester polymer employed with the base oil has the formula

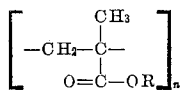

where R is an alkyl group or a mixture of alkyl groups containing from 4 to 20 carbon atoms, and $n$ is a number providing a molecular weight of the polymer of about 10,000 to 20,000. Various methacrylate ester polymers of this type are known which possess pour depressant and also viscosity and viscosity index increasing properties. A very satisfactory material of this type is a copolymer of the lower C4 to C14 alkyl methacrylate esters. A commercial methacrylate copolymer of this type, which is primarily a viscosity index improver, is sold under the trade name "Acryloid 710" by Rohm & Haas, wherein R is predominantly a mixture of lauryl and octyl groups and the molecular weight is about 10,000 to 20,000.

Another commercial material of this type is sold by the same concern under the trade name "Acryloid 150," wherein R is predominantly a mixture of cetyl, lauryl and octyl groups and the molecular weight of the polymer is about 10,000 to 15,000. The latter copolymer predominates in pour depressant properties. Each of these commercial methacrylate copolymers is sold in the form of about a 40% concentrate of the active polymer in a light colored mineral lubricating oil base, providing a clear amber colored viscous liquid having a kinematic viscosity at 210° F. of about 600 to 850 centistokes. In the following description, the copolymer will be listed on an oil-free basis, except where the trade names of the commercial products are specified.

One or more of the methacrylate ester polymers, as described above, may be employed with the base oil in a proportion of about 0.4-3.0% by weight based on the hydraulic oil composition, in order to impart the desired viscosity, viscosity index and pour point. For example, "Acryloid 710" may be employed alone with very satisfactory results with certain base oils; and, in other cases, a mixture of "Acryloid 710" and "Acryloid 150" may be used. Also it will be understood that other methacrylate ester polymers of the foregoing type can be employed. Ordinarily, where "Acryloid 710" is used alone, it is preferred to maintain the proportion of this concentrate below about 4% by weight, or below about 1.6% by weight of active polymer, based on the hydraulic fluid, to better maintain stability of the viscosity and viscosity index properties during prolonged service.

The neutralized $P_2S_5$-olefin polymer reaction product is a known anti-corrosive and antioxidant additive for motor oil service as disclosed in U. S. Patent No. 2,316,080. This material is prepared as described in said patent by reacting a phosphorus sulfide with a mono-olefinic hydrocarbon polymer, and then neutralizing, or partially neutralizing, the reaction product with an alkali metal or alkaline earth metal base. The $P_2S_5$-olefin polymer reaction product shows a titratable acidity ranging from about 10 to about 50 milligrams KOH per gram of product. The neutralization of this reaction product is effected by adding to the reaction product a suitable alkaline compound, such as a hydroxide, a carbonate, or an oxide of an alkali or an alkaline earth metal, and preferably potassium hydroxide. The amount of alkaline material added is sufficient to effect the neutralization of at least about 1% of the titratable acidity, and is generally carried out to provide an additive containing the neutralizing metal, such as potassium, in predominating amount over the phosphorus and sulfur content thereof.

The mono-olefin polymer which is reacted with the phosphorus sulfide may be a polymer resulting from the polymerization of low molecular weight mono-olefins, preferably the iso-mono-olefins, such as isobutylene and isoamylene, and/or copolymers obtained by the polymerization of hydrocarbon mixtures containing iso-mono olefins and mono-olefins of less than 6 carbon atoms, and preferably those of 4 carbon atoms. The polymer may be obtained by the polymerization of these olefins or mixed olefins in the presence of suitable catalysts, such as sulfuric acid, phosphoric acid, boron fluoride, aluminum chloride or other similar halide catalysts of the Friedel-Crafts type. The polymers are generally the mono-olefin polymers in which the molecular weight ranges from about 150 to about 50,000 or more, and preferably from about 500 to 10,000.

This polymer is reacted with from about 1% to about 50%, and preferably from about 5% to about 25%, by weight of $P_2S_5$. Generally, the amount of phosphorus sulfide that will completely react with the polymer, for example around 10%, is used so that no purification is necessary. However, excess phosphorus sulfide may be used and separated from the product after the reaction is completed, by filtering, or by diluting with a solvent such as hexane, filtering and distilling off the solvent. The reaction mixture may be further treated by blowing with steam or nitrogen at an elevated temperature.

The neutralization of the $P_2S_5$-olefin polymer reaction product is then carried out by contacting the reaction product, either as such or dissolved in a suitable solvent, such as naphtha, with a solution of the neutralizing agent, for example, potassium hydroxide dissolved in alcohol. The neutralization may also be accomplished by adding the dry neutralizing agent, such as KOH, NaOH, $Na_2CO_3$, $KHCO_3$, CaO, etc., to the phosphorus sulfide-polymer reaction product, preferably at elevated temperature of from 100° F. to about 400° F., preferably in a non-oxidizing atmosphere.

A commercial product of the foregoing type is one sold under the trade name "Stan-Add 42"

by Standard Oil Co. (Indiana), and is a potassium salt of a $P_2S_5$-isobutylene polymer reaction product. A typical sample of the foregoing product gives the following tests:

| | |
|---|---:|
| Gravity, °API | 18.4 |
| Ash, per cent | 7.12–7.23 |
| Sulfur, per cent | 0.92 |
| Phosphorus, per cent | 1.50–1.62 |
| Potassium, per cent | 2.35–2.43 |
| Flash COC, °F | 390 |
| Pour, °F | 0 |
| Viscosity, SUS at 210° F | 305 |

This neutralized $P_2S_5$-olefin polymer reaction product is employed in the present composition in a proportion within the range of about 0.5–5.0% by weight based on the hydraulic fluid, and preferably about 1.5–4.0%.

The sulfonates employed in accordance with the present invention are the alkaline earth metal salts of alkylated aromatic sulfonic acids wherein the aromatic nucleus may be monocyclic or polycyclic. The formula for the monocyclic compound is

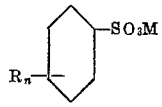

wherein R represents an alkyl group, preferably having from 8 to 30 or more carbon atoms, $n$ is a whole number which may be 1, 2 or 3, depending on whether the aromatic is mono-, di- or tri-alkylated, and M is an alkaline earth metal. These compounds are formed in known manner by alkylating a suitable aromatic compound, such as benzene, alkyl benzenes, naphthalene, alkyl naphthalenes, anthracene, etc. with an olefin in the presence of a suitable alkylation catalyst, such as aluminum chloride, sulfuric acid, phosphoric acid, etc., followed by sulfonating with sulfuric acid, and finally neutralizing the alkylated aromatic sulfonic acid with the metal base. Preferably, the olefin employed is a higher molecular weight olefin having 8 or more carbon atoms, such as a propylene or butylene polymer or mixed polymer, or a higher molecular weight straight chain type of olefin such as octylene, dodecylene, etc. Or the product may be formed by halogenating a paraffin hydrocarbon, such as by chlorinating paraffin wax, followed by alkylating the aromatic hydrocarbon with the halogenated paraffin under conditions to release hydrogen halide and form a mono-, di-, or tri- wax alkylated aromatic hydrocarbon, which is then sulfonated and neutralized as set forth above. A very suitable product of this type is prepared in accordance with the methods disclosed in U. S. Patent No. 2,197,835, particularly on page 4 for type 10 compounds where a metal salt of a wax alkylated aryl sulfonic acid is produced. While any alkaline earth metal salt of this type can be used, the salts of barium and calcium are preferred. Suitable commercial materials of this type have been sold under the trade names of "Santolube 203A" and "Santolube 203-B" by Monsanto Chemical Co. The former is a concentrated solution in lubricating oil of a barium salt of wax alkylated benzene sulfonic acid. Typical tests on this material are the following:

| | |
|---|---:|
| Specific gravity, 60/60 °F | 0.957 |
| Viscosity, SUS at 210 °F | 65 |
| Pour, °C | +5 |
| Flash point, °F | 400 |
| Ba, per cent | 5.0 |
| S, per cent | 1.2 |
| Cl, per cent | 0.1 |

The latter is the same material except that it has been treated with $CO_2$ to effect neutralization of residual alkalinity.

Contrary to previous experience in the motor oil art, the similar alkaline earth metal salts of the petroleum or mahogany sulfonic acids, including the basic petroleum sulfonates, have been found to be unsuitable for this particular service, in that they do not provide satisfactory "squawk" or cycling tests when used in combination with the other additives employed herein. Rather, it has been found that only the alkaline earth metal salts of the alkylated aromatic sulfonic acids of the type described above possess the required properties for purposes of the present invention.

The alkaline earth metal salt of the alkylated aromatic sulfonic acid is employed in the present composition in a proportion within the range of about 0.5–4.0% by weight based on the hydraulic fluid, and preferably about 1.0–3.0%.

The dithiocarbamate additive employed in the present composition is a metal salt of an N-substituted dithiocarbamic acid of the formula

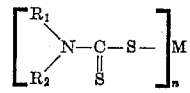

where M is a metal, $n$ is a whole number corresponding to the valence of M, and R1 and R2 are selected from the group consisting of hydrogen, alkyl, aryl, alkaryl or aralkyl, with at least one R being other than hydrogen. The alkali metal dithiocarbamate is prepared in known manner by reacting a primary or preferably a secondary amine with carbon disulfide and aqueous or alcoholic caustic soda or caustic potash. The various polyvalent metal dithiocarbamates may be prepared from the alkali metal dithiocarbamate by double decomposition. The preferred dithiocarbamates for purposes of the present invention are the polyvalent metal dithiocarbamates in which R1 and R2 are both hydrocarbon and preferably alkyl groups having from 4 to 20 carbon atoms each to impart oil solubility. The preferred polyvalent metals are zinc and cadmium, although other metals can be used such as lithium, sodium potassium, magnesium, calcium, barium, aluminum, tin and lead.

Illustrative examples of dithiocarbamates that may be used in accordance with this invention are zinc dibutyl dithiocarbamate; cadmium methyl octyl dithiocarbamate; calcium dicetyl dithiocarbamate; zinc diamyl dithiocarbamate; zinc monocetyl dithiocarbamate; zinc butyl amylphenyl dithiocarbamate; calcium diphenyl dithiocarbamate; and zinc di(cetyl phenyl) dithiocarbamate. A readily available commercial material of this type is zinc dibutyl dithiocarbamate, which is a white to tan powder having the following tests:

| | |
|---|---:|
| Zn, per cent | 13.0–14.5 |
| S, per cent | 27.0–28.5 |
| Sulphated ash, per cent | 24–26 |
| Benzene insoluble (4 g. in 100 ml. benzene), per cent | 1.0 |

The dithiocarbamate additive is employed in the present composition in a proportion within the range of about 0.2–2.0% by weight based on the hydraulic fluid, and preferably about 0.5–1.25%.

The present hydraulic fluid also preferably includes a suitable anti-foam agent, since hydraulic fluids are circulated rapidly in operation and air may be entrapped. For this purpose, a silicone polymer of high viscosity, such as a dimethyl silicone polymer having a kinematic viscosity at 25° C. of about 1000 centistokes and above, is preferably employed, since this agent also desirably increases the flash point of the fluid. The use of a high viscosity silicone polymer in a hydraulic fluid of the mineral lubricating oil type to inhibit foaming and increase the flash point is disclosed and claimed in the copending application of Charles C. Towne, filed August 25, 1949, Ser. No. 112,399 which issued December 8, 1953, as U. S. 2,662,055. A silicone polymer is conveniently employed in the form of a concentrate in a hydrocarbon solvent, such as kerosene. For example, a very satisfactory anti-foam agent for this purpose is prepared by diluting 10 grams of a dimethyl silicone polymer (1000 cs. at 25° C.) with kerosene to bring the volume to 100 ccs. A proportion of the order of 0.0–0.025% by weight of the immediately foregoing concentrate is ordinarily employed, preferably sufficient to provide about 50 to 200 parts per million of the silicone polymer concentrate on the basis of the hydraulic fluid.

Where the requirements of the hydraulic fluid are somewhat less exacting, a satisfactory hydraulic fluid for purposes of the present invention can be produced by combining the neutralized $P_2S_5$-olefin polymer reaction product with the alkaline earth metal salt of an alkylated aromatic sulfonic acid in the proportion ranges stated in the refined mineral lubricating oil, which preferably also contains the methacrylate ester polymer and the anti-foam agent. Likewise, a hydraulic fluid of the present invention which is superior in the cycling test can be prepared by combining the neutralized $P_2S_5$-olefin polymer reaction product with the dithiocarbamate additive in the proportions listed above in the mineral lubricating oil, preferably in conjunction with the methacrylate ester polymer and the anti-foam agent. Also, a hydraulic fluid which gives satisfactory results in the cycling test is provided in accordance with the present invention by combining the alkaline earth metal salt of the alkylated aromatic sulfonic acid with the dithiocarbamate additive in the proportions listed above in the mineral lubricating oil, preferably also in conjunction with the methacrylate ester polymer and the antifoam agent.

In order to provide a hydraulic fluid which is superior in both the cycling test and the squawk test, as well as satisfactorily meeting the other requirements of an automatic transmission fluid, all three additives, namely the neutralized $P_2S_5$-olefin polymer reaction product, the alkaline earth metal salt of an alkylated aromatic sulfonic acid and the dithiocarbamate, are combined in the mineral lubricating oil in the proportions listed above, preferably in conjunction with the methacrylate ester polymer and the anti-foam agent.

The following examples are given to further illustrate the present invention:

Example I

A hydraulic fluid was prepared utilizing as a base oil a solvent refined, lightly acid treated, clay contacted and solvent de-waxed paraffin base distillate mineral lubricating oil having an SUS viscosity at 100° F. of 110. The hydraulic fluid had the following composition in percentage by weight:

| | |
|---|---|
| Base oil | 90.75 |
| "Acryloid 710" | 6.00 |
| "Acryloid 150" | 0.25 |
| "Stan-Add 42" | 2.00 |
| Zinc dibutyl dithiocarbamate | 1.00 |
| Dimethyl silicone polymer concentrate as above _____ p. p. m__ | 150 |

An oven sludge test was run on this fluid as a preliminary screening test to reject compositions which are inferior in respect to high temperature breakdown and sludging and, therefore, incapable of passing the cycling test. This sludge test is run by placing a sample of the fluid in an oven for 150 hours at 350° F., and then measuring the weight percent of sludge formed. In this test, the foregoing hydraulic fluid gave merely a trace of sludge, and was, therefore, deemed satisfactory for the more extended service tests.

A CRC L-4 Oxidation test was run on the foregoing composition when diluted with an equal volume of the refined uninhibited lubricating oil. The test was run at 265° F. crankcase temperature in accordance with conventional procedure. Passing this test requires a copper-lead bearing weight loss below a specified maximum, and a satisfactory CRC rating and piston rating with respect to deposits or engine cleanliness. The results obtained on this test were as follows:

| | |
|---|---|
| Bearing weight loss grams | 0.210 |
| Piston rating | 8.8 |
| Total rating | 89.8 |

The foregoing bearing weight loss is well below the specified maximum and is clearly satisfactory. The piston rating is on a numerical scale from 0–10, with 10 representing a perfectly clean piston and lower numbers representing progressively poorer results due to increased varnish and deposits. A piston rating above 8 in this test is very good. The over-all CRC rating is on a basis of 100 for perfect over-all cleanliness; and a value above 85 is quite satisfactory. The foregoing tests show that this hydraulic fluid clearly qualified in this test.

A cycling test was also run on the foregoing composition. This cycling test is carried out in a production V-8 Cadillac engine of 165 H. P. mounted on a regular dynamometer test stand, and driving a dynamometer through a production "Hydramatic" transmission. The throttle setting is varied by a cam-solenoid arrangement to provide a cycle of 20 secs. at idling speed and then 40 secs at full throttle opening. During the full throttle opening the transmission shifts through all four forward speeds and then runs at full throttle speed. Conditions for this test include an average load of 128 H. P., a top speed in fourth gear at full throttle of 3200 R. P. M., and a transmission oil temperature of 275° F. The test is run for a period of 110 hours, or for a lesser time up until oil failure. Oil failure is defined as that point at which the transmission takes more than 10 secs. to shift into fourth gear (with new satisfactory transmission fluids, the time is usually 4.5–6 secs.) or when excessive slippage is noted. After termination of the test, the transmission is disassembled and the condition of the oil and transmission noted. Of especial interest is the condition of the clutch plate facings. Also, close observation of sludge and varnish formation is made.

Results obtained in the foregoing cycling test on the said hydraulic fluid were as follows:

New oil tests:
    Viscosity SUS at 210° F. _____ 55.65
    Viscosity index _____ 150.5
    Neut. number _____ 0.12
Hours to termination _____ 110
Cause of termination _____ Specified duration
Condition of clutch plates _____ Excellent The foregoing results demonstrated that this particular hydraulic fluid composition is superior in this rigorous cycling test.

The foregoing composition of Example I was also subjected to a "squawk" test. This is carried out in a 1948 Cadillac equipped with a 1947 production "Hydramatic" transmission. Alternate full and part throttle accelerations are made, with the transmission going through normal shifting. Tests are started with the bulk oil temperature below 100° F. and the oil is allowed to heat up in normal operation. Temperatures are recorded at the beginning of each acceleration and the "squawk" tendency of the transmission on the second-third upshift is noted. The test is stopped when 10 full throttle "squawks" on the second-third upshift are recorded. In the case of hydraulic fluids with which little or no "squawking" is noted, the test is continued for 75 cycles up to a bulk oil temperature of approximately 310° F. before ending the test.

The results obtained in the forgoing "squawk" test were as follows:

New oil tests:
    Viscosity SUS at 210° F. _____ 54.96
    Viscosity index _____ 151
    Pour point, ° F. _____ −55
"Squawk" test rating _____ Poor The foregoing rating signifies that this particular hydraulic fluid composition gave appreciable chatter or "squawk" on the second-third upshift, and is little, if any, better in this respect than conventional automatic transmission fluids heretofore on the market.

*Example II*

A hydraulic fluid was prepared, utilizing the base oil of Example I, which had the following composition in percent by weight:

Paraffin base distillate mineral lubricating
  oil _____ 90.75
"Acryloid 710" _____ 6.0
"Acryloid 150" _____ 0.25
"Santolube 203A" _____ 2.0
Zinc dibutyl dithiocarbamate _____ 1.0
Dimethyl silicone polymer concentrate, as
  listed above _____p. p. m__ 150

The following tests were obtained on this hydraulic fluid:

Oven sludge test:
    Sludge, per cent_____ Trace
CRC L-4 test:
    Bearing weight loss grams_____ 0.08
    Piston rating_____ 8.0
    Total CRC rating_____ 88.0
    Used oil tests—
      SUS viscosity at 210° F_____ 50.2
      16 hour neut. number_____ 1.4
      36 hour neut. number_____ 1.4

Cycling test:
  New oil tests—
    SUS viscosity at 210° F_____ 54.45
    Viscosity index_____ 151
  Hours to termination_____ 61
  Cause of termination_____ Delayed shift
  Clutch plate condition_____ Poor
  Used oil tests—
    SUS viscosity at 210° F_____ 50.1
    Viscosity index_____ 146
"Squawk" test:
  New oil tests—
    SUS viscosity at 210° F_____ 54.0
    Viscosity index_____ 150
    Pour point, ° F_____ −50
  "Squawk" test rating_____ Good From the foregoing results, it will be seen that this composition was superior to that of Example I in the "squawk" test and gave satisfactory results in the L-4 test. It was somewhat inferior to that of Example I in the cycling test. However, for certain purposes, the foregoing composition represents a satisfactory hydraulic fluid which will afford quiet operation of an automatic transmission.

*Example III*

The following composition was prepared, employing the base oil of Example I:

Paraffin base distillate mineral lubricating
  oil _____ 88.75
"Acryloid 710" _____ 6.0
"Acryloid 150" _____ 0.25
"Stan-Add 42" _____ 2.0
"Santolube 203A" _____ 2.0
Zinc dibutyl dithiocarbamate _____ 1.0
Dimethyl silicone polymer concentrate as
  above _____p. p. m__ 150

The following tests were obtained on this composition:

CRC L-4 test:
    Bearing weight loss grams_____ 0.13
    Piston rating_____ 8.7
    Total CRC rating_____ 87.7
    Used oil tests—
      SUS viscosity at 210° F_____ 49.8
      16 hour neut. number_____ 1.1
      36 hour neut. number_____ 1.6
Cycling test:
  New oil tests—
    SUS viscosity at 210° F_____ 55.96
    Viscosity index_____ 150.5
    Neut. number_____ 0.33
  Hours to termination_____ 110
  Cause of termination_____ Specified duration
  Clutch plate condition_____ Excellent
"Squawk" test:
  New oil tests—
    SUS viscosity at 210° F_____ 55.96
    Viscosity index_____ 150.5
    Pour point, ° F_____ −55
  "Squawk" test rating_____ Good The foregoing tests show that this composition containing all three additives, in addition to the methacrylate ester polymer and the antifoam agent, is an unusually superior hydraulic fluid for automatic transmissions.

*Example IV*

A hydraulic fluid was prepared utilizing as a base oil 70% by volume of the oil used in Example I and 30% by volume of a solvent refined, light acid treated, clay contacted and solvent dewaxed paraffin base distillate mineral lubricating oil having an SUS viscosity at 100° F. of approximately 153. Tests on the base oil blend were:

| | |
|---|---|
| Gravity, °API | 31.7 |
| SUS viscosity at 100° F | 124.6 |
| SUS viscosity at 210° F | 41.2 |
| Viscosity index | 93 |
| Pour point, °F | −10 |

Utilizing the foregoing base oil, the following composition was prepared:

| | |
|---|---|
| Base oil | 91.485 |
| "Acryloid 710" | 3.5 |
| "Stan-Add 42" | 2.0 |
| "Santolube 203A" | 2.0 |
| Zinc dibutyl dithiocarbamate | 1.0 |
| Dimethyl silicone polymer concentrate as above | 0.015 |

The following tests were obtained on the foregoing composition:

Viscosity:
New oil—
SUS at 0° F _____ 5200
SUS at 100° F _____ 187.5
SUS at 210° F _____ 49.87
Oil after cycling test—
SUS at 0° F _____ 5050
SUS at 100° F _____ 167.7
SUS at 210° F _____ 46.8
Viscosity index:
Before cycling test _____ 140.1
After cycling test _____ 131.7
Flash point, °F _____ 425
Fire point, °F _____ 465
Pour point, °F _____ −45
Corrosion, copper strip, 3 hrs. at 300° F ___ Pass
Carnegie foam test _____ Pass
Heat test, 125 hours at 250° F _____ Pass
Effect on seals:
Tensile strength of specimen—
Before test, lbs. p. s. i _____ 720
After test, lbs. p. s. i _____ 500
CRC L-4 test on undiluted fluid:
Bearing weight loss, grams _____ 0.214
Piston rating _____ 8.2
Total CRC rating _____ 88.2
CRC L-4 test on fluid diluted 50% with uninhibited base oil:
Bearing weight loss, grams _____ 0.370
Piston rating _____ 8.3
Total CRC rating _____ 87.3
Non-chatter ("squawk") test _____ Very good
Cycling test:
Hours to termination _____ 110
Reason for termination__Specified duration
Clutch plate condition after test _____ Good The foregoing results show that this hydraulic fluid is also unusually superior, particularly in the "squawk" test and cycling test, as an automatic transmission fluid.

While the foregoing examples employing certain specific compounds have been listed for purposes of illustration on a comparative basis, it is to be understood that similar satisfactory hydraulic fluid compositions are produced by substituting other compounds falling within each of the foregoing specified classes of additives, as listed above. Moreover, while a dimethyl silicone polymer has been specifically enumerated as an anti-foam agent, it will be understood that other types of liquid silicone polymers, particularly the dihydrocarbon silicone polymers as disclosed in U. S. Patent No. 2,375,007, such as diethyl, methyl ethyl, diphenyl, phenyl ethyl, and methyl phenyl silicone polymers, can be employed for this purpose. Also, it will be understood that satisfactory hydraulic fluids for various purposes can be prepared by utilizing two, or all three, of the additives in combination, together with the methacrylate ester polymer and the foam inhibitor, within the following proportion ranges:

| | Weight percent |
|---|---|
| Methacrylate ester polymer | 0.4–4.0 |
| Neutralized P$_2$S$_5$-olefin polymer reaction product | 0.5–5.0 |
| Alkaline earth metal salt of alkylated aromatic sulfonic acid | 0.5–4.0 |
| Metal salt of N-substituted dithiocarbamic acid | 0.25–2.0 |
| Foam inhibitor | 0.005–0.025 |
| Mineral lubricating oil | Balance |

Obviously, many other modifications and variations of the invention as hereinbefore set forth may be made without departing from the spirit and scope thereof, and therefore, only such limitations should be imposed as are indicated in the appended claims.

We claim:

1. A hydraulic transmission fluid adapted for automatic transmissions consisting essentially of the following constituents in percentage by weight:

| | |
|---|---|
| Mineral lubricating oil | 86–95 |
| Polymer of mixed octyl and lauryl esters of methacrylic acid having 10,000–20,000 molecular weight | 0.4–2.0 |
| K neutralized P$_2$S$_5$-olefin polymer reaction product | 0.5–5.0 |
| Ba salt of wax alkylated benzene sulfonic acid | 0.5–4.0 |
| Zn dibutyl dithiocarbamate | 0.25–2.0 |
| Silicone polymer concentrate__p. p. m | 50–200 |

2. A hydraulic transmission fluid adapted for automatic transmissions consisting essentially of the following constituents in the approximate percentages by weight:

| | |
|---|---|
| Paraffin base distillate mineral lubricating oil | 91.5 |
| Polymer of mixed octyl and lauryl esters of methacrylic acid having 10,000–20,000 molecular weight | 1.4 |
| K neutralized P$_2$S$_5$-olefin polymer reaction product | 2.0 |
| Ba salt of wax alkylated benzene sulfonic acid | 2.0 |
| Zn dibutyl dithiocarbamate | 1.0 |
| Dimethyl silicone polymer concentrate _____ p. p. m | 150 |

3. A hydraulic transmission fluid adapted for automatic transmissions comprising at least 85 weight per cent of a mineral lubricating oil, about 0.5 to 5.0 weight per cent of a P$_2$S$_5$-olefin polymer reaction product neutralized with a base of a metal selected from the group consisting of alkali and alkaline earth metals, about 0.5 to 4.0 weight per cent of an alkaline earth metal salt of an alkylated aromatic sulfonic acid wherein the sum of alkyl groups on the aromatic nucleus is at least 8 carbon atoms and about 0.25 to 2.0 weight per cent of a polyvalent metal salt of a dithiocarbamic acid of the formula:

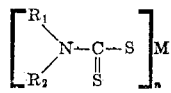

wherein M is a polyvalent metal, $n$ is a whole number corresponding to the valence of M and $R_1$ and $R_2$ are hydrocarbon groups having from 4 to 20 carbon atoms each, said hydraulic transmission fluid being capable of passing both the squawk and cycling tests for automatic transmission fluids.

4. A hydraulic transmission fluid according to claim 3, wherein the said neutralized reaction product is a potassium salt, the said alkaline earth metal salt is a barium salt, and the said polyvalent metal salt is a zinc dialkyl dithiocarbamate.

5. A hydraulic transmission fluid according to claim 3, wherein the said alkaline earth metal salt is a barium salt of wax alkylated benzene sulfonic acid, and the said polyvalent metal salt is zinc dibutyl dithiocarbamate.

6. A hydraulic transmission fluid adapted for automatic transmissions comprising at least 85 weight per cent of a mineral lubricating oil, about 0.4 to 2.0 weight per cent of a methacrylate ester polymer, about 0.5 to 5.0 weight per cent of a $P_2S_5$-olefin polymer reaction product neutralized with a base of a metal selected from the group consisting of alkali and alkaline earth metals, about 0.5 to 4.0 weight per cent of an alkaline earth metal salt of an alkylated aromatic sulfonic acid wherein the sum of alkyl groups on the aromatic nucleus is at least 8 carbon atoms and about 0.25 to 2.0 weight per cent of a polyvalent metal salt of a dithiocarbamic acid of the formula:

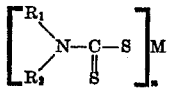

wherein M is a polyvalent metal, $n$ is a whole number corresponding to the valence of M and $R_1$ and $R_2$ are hydrocarbon groups having from 4 to 20 carbon atoms each, said hydraulic transmission fluid being capable of passing both the squawk and cycling tests for automatic transmission fluids.

7. A hydraulic transmission fluid according to claim 6 in which said methacrylate ester polymer has a molecular weight of 10,000 to 20,000.

8. A hydraulic transmission fluid according to claim 6 wherein said neutralized reaction product is a potassium salt, said alkaline earth metal salt is a barium salt, and said polyvalent metal salt is a zinc dialkyl dithiocarbamate.

9. A hydraulic transmission fluid according to claim 6 in which said alkaline earth metal salt is a barium salt of wax alkylated benzene sulfonic acid, and said polyvalent metal salt is zinc dibutyl dithiocarbamate.

10. A hydraulic transmission fluid according to claim 6 in which said mineral lubricating oil has an SUS viscosity at 100° F. below 150 seconds.

References Cited in the file of this patent

UNITED STATES PATENTS

| Number | Name | Date |
|---|---|---|
| 2,316,080 | Loane et al. | Apr. 6, 1943 |
| 2,375,007 | Larsen et al. | May 1, 1945 |
| 2,450,633 | Clayton | Oct. 5, 1948 |
| 2,459,717 | Perry | Jan. 18, 1949 |
| 2,504,552 | Lewis | Apr. 18, 1950 |
| 2,636,858 | Jones et al. | Apr. 28, 1953 |